United States Patent [19]

Anthony et al.

[11] Patent Number: 5,022,801

[45] Date of Patent: Jun. 11, 1991

[54] CVD DIAMOND COATED TWIST DRILLS

[75] Inventors: Thomas R. Anthony, Schenectady; James F. Fleischer, Scotia, both of N.Y.

[73] Assignee: The General Electric Company, Worthington, Ohio

[21] Appl. No.: 555,879

[22] Filed: Jul. 18, 1990

[51] Int. Cl.⁵ .............................................. B23B 51/02
[52] U.S. Cl. .................................. 408/144; 76/108.6; 408/145; 408/227
[58] Field of Search .............. 408/144, 145, 227, 230; 76/108.6

[56] References Cited

U.S. PATENT DOCUMENTS

| | | | |
|---|---|---|---|
| 4,707,384 | 11/1987 | Schachner et al. | 427/250 |
| 4,731,296 | 3/1988 | Kikuchi et al. | 29/DIG. 16 |
| 4,762,445 | 8/1988 | Bunting et al. | 408/145 |

FOREIGN PATENT DOCUMENTS

| | | | |
|---|---|---|---|
| 132652 | 2/1985 | European Pat. Off. | 408/145 |
| 80510 | 5/1985 | Japan | 408/230 |
| 2034704 | 2/1987 | Japan | 408/145 |
| 2057802 | 3/1987 | Japan | 408/145 |
| 218010 | 9/1987 | Japan | 408/145 |
| 306805 | 12/1988 | Japan | 408/145 |

Primary Examiner—Danel W. Howell
Attorney, Agent, or Firm—Mueller and Smith

[57] ABSTRACT

The present invention is directed to a twist drill which is coated with a layer of CVD diamond and which has slots in its head which are filled with CVD diamond. The invention twist drill is made by forming slots in the head of the twist drill and then subjecting the slotted twist drill to a CVD diamond deposition process for coating said twist drill with a layer of CVD diamond and for filling said slots with CVD diamond. The performance of CVD diamond-coated twist drills does not depend on retaining the diamond film over most of the areas of the drill; but, rather, drill performance is dependent upon retaining a layer of diamond on the cutting edge of the drill. The diamond-filled slots in the head of the twist drill function as wear stops and additional cutting edges as the surrounding drill material is worn away during use.

9 Claims, 1 Drawing Sheet

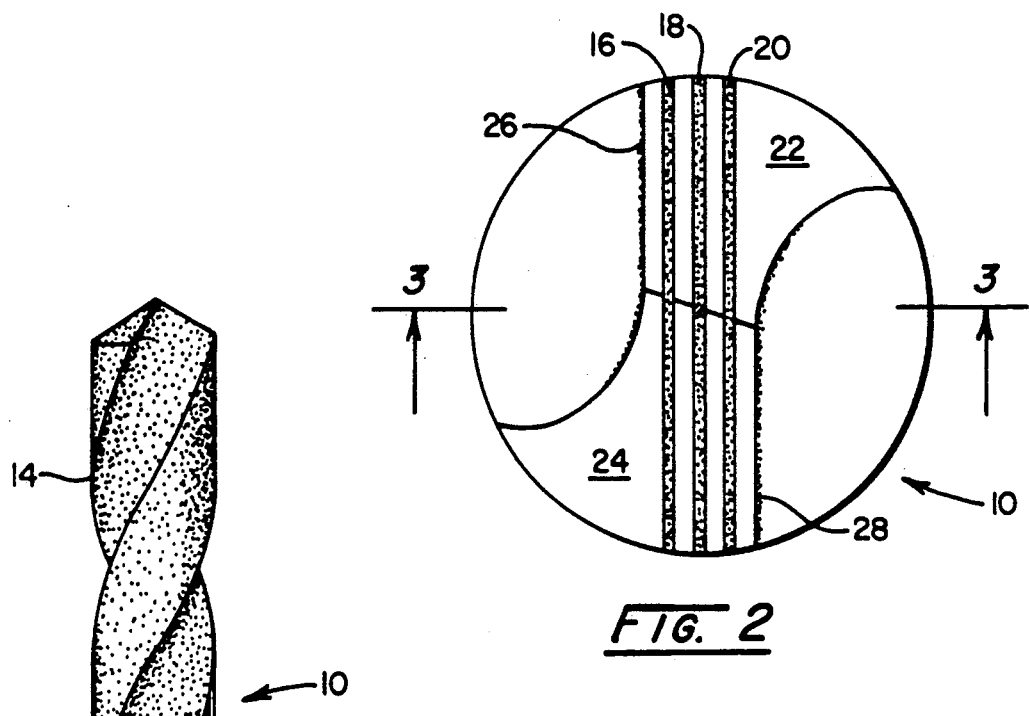
FIG. 2
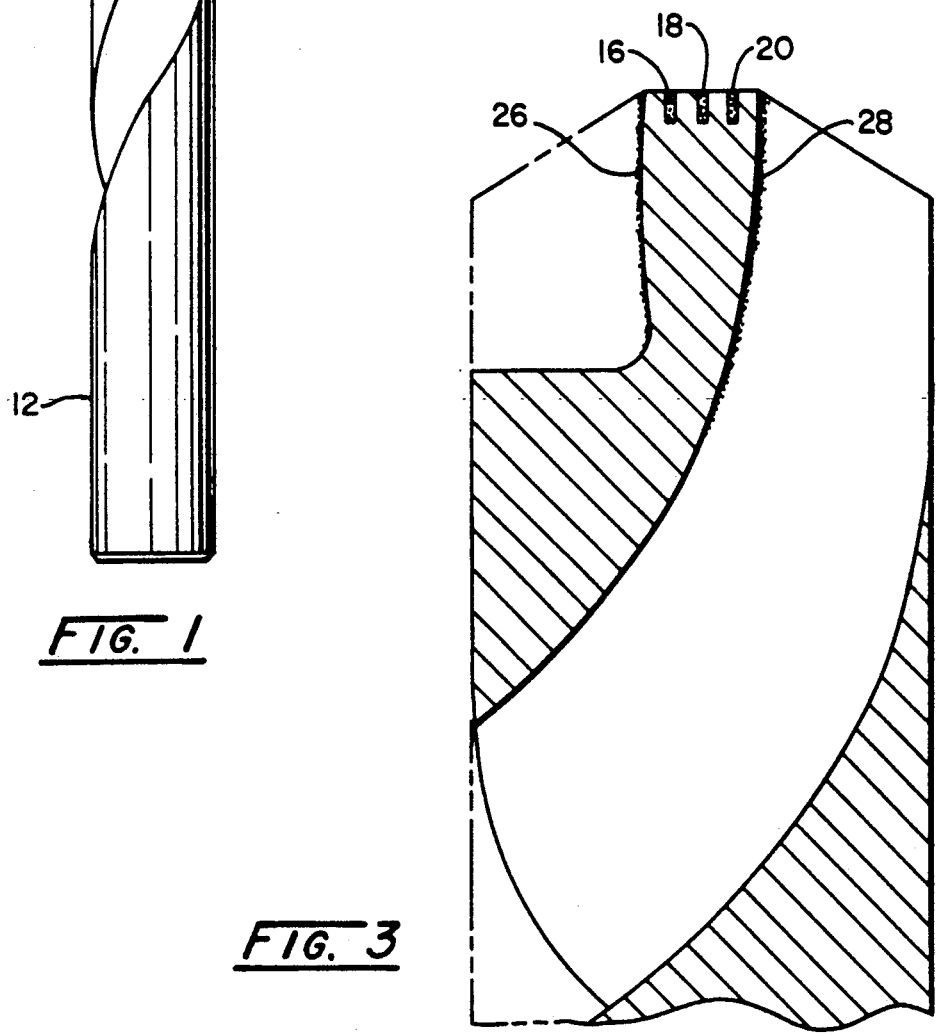
FIG. 1
FIG. 3

CVD DIAMOND COATED TWIST DRILLS

BACKGROUND OF THE INVENTION

The present invention relates to diamond coated workpieces and more particularly to an improved CVD diamond coated twist drill.

Its hardness and thermal properties are but two of the characteristics that make diamond useful in a variety of industrial components. Initially, natural diamond was used in a variety of abrasive applications. With the ability to synthesize diamond by high pressure/high temperature (HP/HT) techniques utilizing a catalyst/sintering aid under conditions where diamond is the thermally stable carbon phase, a variety of additional products found favor in the marketplace. Polycrystalline diamond compacts, often supported on a tungsten carbide support in cylindrical or annular form, extended the product line for diamond additionally. However, the requirement of high pressure and high temperature has been a limitation in product configuration, for example.

Recently, industrial effort directed toward the growth of diamond at low pressures, where it is metastable, has increased dramatically. Although the ability to produce diamond by low-pressure synthesis techniques has been known for decades, drawbacks including extremely low growth rates prevented wide commercial acceptance. Recent developments have led to higher growth rates, thus spurring recent industrial interest in the field. Additionally, the discovery of an entirely new class of solids, known as "diamond like" carbons and hydrocarbons, is an outgrowth of such recent work.

Low pressure growth of diamond has been dubbed "chemical vapor deposition" or "CVD" in the field. Two predominant CVD techniques have found favor in the literature. One of these techiques involves the use of a dilute mixture of hydrocarbon gas (typically methane) and hydrogen wherein the hydrocarbon content usually is varied from about 0.1% to 2.5% of the total volumetric flow. The gas is introduced via a quartz tube located just above a hot tungsten filament which is electrically heated to a temperature ranging from between about 1750° to 2400° C. The gas mixture disassociates at the filament surface and diamonds are condensed onto a heated substrate placed just below the hot tungsten filament. The substrate is held in a resistance heated boat (often molybdenum) and heated to a temperature in the region of about 500° to 1100° C.

The second technique involves the imposition of a plasma discharge to the foregoing filament process. The plasma discharge serves to increase the nucleation density, growth rate, and it is believed to enhance formation of diamond films as opposed to discrete diamond particles. Of the plasma systems that have been utilized in this area, there are three basic systems. One is a microwave plasma system, the second is an RF (inductively or capacitively coupled) plasma system, and the third is a d.c. plasma system. The RF and microwave plasma systems utilize relatively complex and expensive equipment which usually requires complex tuning or matching networks to electrically couple electrical energy to the generated plasma. Additionally, the diamond growth rate offered by these two systems can be quite modest.

Heretofore, CVD diamond has been coated onto tungsten carbide or other substrates to make cutting tool inserts (U.S. Pat. Nos. 4,707,384 and 4,731,296) or co-deposited with boron or another element for making semiconductors (e.g. EP Publications Nos. 286,306 and 282,054). Commonly-assigned application Ser. No. 563,367, filed Aug. 7, 1990, discloses a CVD reactor especially adapted to coat twist drills with a layer of CVD diamond.

BROAD STATEMENT OF THE INVENTION

The present invention is directed to a twist drill which is coated with a layer of CVD diamond and which has slots in its head which are filled with CVD diamond. The inventive twist drill is made by forming slots in the head of the twist drill and then subjecting the slotted twist drill to a CVD diamond deposition process for coating said twist drill with a layer of CVD diamond and for filling said slots with CVD diamond. The performance of CVD diamond-coated twist drills does not depend on retaining the diamond film over most of the areas of the drill; but, rather, drill performance is dependent upon retaining a layer of diamond on the cutting edge of the drill. The diamond-filled slots in the head of the twist drill function as wear stops and additional cutting edges as the surrounding drill material is worn away during use.

Accordingly, advantages of the present invention include a twist drill designed for improved wear performance. Another advantage is the ability to readily manufacture such new twist drill design. These and other advantages will be readily apparent to those skilled in the art based upon the disclosure contained herein.

BRIEF DESCRIPTION OF THE DRAWINGS

FIG. 1 shows a twist drill coated with a layer of CYD diamond.

FIG. 2 shows an end view of a drill having slots filled with CVD diamond.

FIG. 3 shows a sectional view taken through the plane 3—3 shown in FIG. 2.

DETAILED DESCRIPTION OF THE INVENTION

Twist drills are used extensively in the industrial world. The hardest and longest lasting twist drills are manufactured of tungsten carbide. Even tungsten carbide twist drills, however, suffer premature failure when drilling some composite materials. One means for making such twist drill even harder is to deposit a coating of CVD diamond thereon. As noted above, the performance of CVD diamond-coated twist drills does not depend on retaining the diamond film over most of the areas of the drill since many areas of the twist drill do not present a cutting edge and, therefore, are not directly involved in cutting performance. Rather, twist drill performance can be improved if the CVD diamond layer is retained on the cutting edge of the drill. Experience has revealed that CVD diamond is retained on surfaces perpendicular to the main shear planes involved in drilling, such as the plane forming the cutting edge of the drill.

Referring to the drawings, FIG. 1 reveals twist drill 10 that includes shank portion 12 and fluted region 14 which is coated with a layer of CVD diamond. FIG. 2 reveals slots 16, 18, and 20, filled with CVD diamond, which slots have been formed in head portions 22 and 24 of drill 10. It will be observed that slots 16–18 cut through head portion 22 are parallel to cutting edge 26 and through head portion 24 are parallel to cutting edge 28. Thus, as the drill bit material erodes from head portions 22 and 24, CVD diamond-filled slots 16–20 function as wear stops and provide additional cutting edges as the surrounding material is eroded. A cross-sectional elevational view of this arrangement can be seen by reference to FIG. 3.

Slots 16–20 can be in greater or lesser number on the head of twist drill 10 depending upon the size of the drill, and like factors. While twist drill 10 often will be formed of tungsten carbide, it can be formed of a variety of metals and alloys as those skilled in the art will appreciate. Slots 16–20 can be formed in the head of twist drill 10 during its fabrication or by utilizing a diamond saw, laser, or electro discharge machining (EDM) techniques. Other techniques may be envisioned by those skilled in the art. The particular method for forming the slots in the head of twist drill 10 is unimportant.

Of importance is the disposition of the twist drill within a CVD reactor for coating fluted end 14 with a layer of CVD diamond and for filling slots 16–20 with CVD diamond. While a variety of conventional CVD reactors can be used in coating the inventive twist drills, it is preferred to utilize the reactor and method disclosed in commonly-assigned application Ser. No. 563,367, cited above. Such CVD diamond reactor includes a vacuum chamber, inlet for feed hydrogen/hydrocarbon mixtures, and an outlet. The entire outer surface of stationary elongate objects, such as twist drills, can be coated by disposing within the reactor, an elongate metal tube having a plurality of apertures for holding elongate objects disposed radially inwardly and having a cooling pipe in thermal contact with and disposed about the outside of the metal tube. A filament runs within the tube along its lengthwise extent and is in electrical connection with a source of voltage for heating the filament to a temperature adequate to initiate hydrocarbon disassociation. The portions of the twist drills within the tube, e.g. fluted end 14, surrounding the filament is heated thereby while cooling fluid passed through the cooling pipes control the drill bit temperature to be within the CVD diamond-forming temperature range for objects being coated thereby.

With respect to the process for coating of the twist drills with a layer of CVD diamond, the filament is heated to a temperature of between about 1750° and 2500° C. with d.c. or a.c. An electrical bias with respect to the aperture tube also can be provided. Such reactor design and process can effectively and efficiently coat fluted end portion 14 as well as fill slots 16–20 with CVD diamond.

With respect to conventional CVD processes useful in the present invention, hydrocarbon/hydrogen gaseous mixtures are fed into a CVD reactor as an initial step. Hydrocarbon sources can include the methane series gases, e.g. methane, ethane, propane; unsaturated hydrocarbons, e.g. ethylene, acetylene, cyclohexene, and benzene; and the like. Methane, however, is preferred. The molar ratio of hydrocarbon to hydrogen broadly ranges from about 1:10 to about 1:1,000 with about 1:100 being preferred. This gaseous mixture optionally may be diluted with an inert gas, e.g. argon. The gaseous mixture is at least partially decomposed thermally hot filament 20 which normally is formed of tungsten, molybdenum, tantalum, or alloys thereof. U.S. Pat. No. 4,707,384 illustrates this process.

The gaseous mixture partial decomposition also can be conducted with the assistance of d.c. discharge or radio frequency electromagnetic radiation to generate a plasma, such as prosposed in U.S. Pat. Nos. 4,749,587, 4,767,608, and 4,830,702; and U.S. Pat. No. 4,434,188 with respect to use of microwaves. The twist drills may be bombarded with electrons during the CVD deposition process in accordance with U.S. Pat. No. 4,740,263.

Regardless of the particular method used in generating the partially decomposed gaseous mixture, the twist drills are maintained at an elevated CVD diamond-forming temperature which typically ranges from about 500° to 1100° C. and preferably in the range of about 850° to 950° C. where diamond growth is at its highest rate in order to minimize grain size. Pressures in the range of from about 0.01 to 1000 Torr, advantageously about 1–800 Torr, are taught in the art, with reduced pressure being preferred. Details on CVD processes additionally can be reviewed by reference to Angus, et al., "Low-Pressure, Metastable Growth of Diamond and 'Diamondlike' Phases", *Science*, vol. 241, pages 913–921 (Aug. 19, 1988); and Bachmann, et al., "Diamond Thin Films", *Chemical and Engineering News*, pp. 24–39 (May 15, 1989).

In this application, all units and proportions are by weight and all units are in the metric system, unless otherwise expressly indicated. Also, all citations referred to herein are expressly incorporated herein by reference.

We claim:

1. A method for making a twist drill which comprises:
   (a) forming slots in the head of said twist drill; and
   (b) subjecting said slotted twist drill to a CVD diamond deposition process for coating said twist drill with a layer of CVD diamond and for filling said slots with CVD diamond.

2. The method of claim 1 wherein said slots are formed by a saw, with a laser, or by electrodischarge machining.

3. The method of claim 1 wherein said slotted twist drill is heated to a temperature of between about 500° and 1100° C. during said CVD diamond deposition process.

4. The method of claim 1 wherein said slotted twist drill is coated with CVD diamond by placing said drill in a vacuum chamber of a diamond reactor held under CVD diamond-forming conditions wherein a flow of hydrogen/hydrocarbon mixture is at least partially disassociated.

5. The method of claim 3 wherein a filament is heated to temperature ranging from between about 1750° and 2400° C. to at least partially disassociate said hydrogen/hydrocarbon mixture.

6. The method of claim 1 wherein said twist drill is formed from tungsten carbide.

7. A twist drill coated with a layer of CVD diamond and having slots in the head thereof filled with CVD diamond.

8. The twist drill of claim 7 which is formed from tungsten carbide.

9. The twist drill of claim 7 which is formed of a metal.

* * * * *